(12) United States Patent
Van Der Mik et al.

(10) Patent No.: US 10,100,950 B2
(45) Date of Patent: Oct. 16, 2018

(54) PIPE CLAMP

(71) Applicant: J. Van Walraven Holding B.V., Mijdrecht (NL)

(72) Inventors: Robert Van Der Mik, Tienhoven (NL); Frank Nijdam, Zeewolde (NL)

(73) Assignee: J. van Walraven Holding B.V., Mijdrecht (NL)

( * ) Notice: Subject to any disclaimer, the term of this patent is extended or adjusted under 35 U.S.C. 154(b) by 0 days.

(21) Appl. No.: 15/548,917

(22) PCT Filed: Feb. 1, 2016

(86) PCT No.: PCT/NL2016/050072
§ 371 (c)(1),
(2) Date: Aug. 4, 2017

(87) PCT Pub. No.: WO2016/129993
PCT Pub. Date: Aug. 18, 2016

(65) Prior Publication Data
US 2018/0031149 A1     Feb. 1, 2018

(30) Foreign Application Priority Data

Feb. 13, 2015  (NL) .................................... 2014294
Sep. 24, 2015  (NL) .................................... 2015499

(51) Int. Cl.
*F16L 3/08*        (2006.01)
*F16L 3/24*        (2006.01)
(Continued)

(52) U.S. Cl.
CPC ............. *F16L 3/24* (2013.01); *F16L 3/1008* (2013.01); *F16L 3/1075* (2013.01); *F16L 55/035* (2013.01)

(58) Field of Classification Search
CPC ......... F16L 3/24; F16L 3/1008; F16L 3/1075; F16L 55/035
(Continued)

(56) References Cited

U.S. PATENT DOCUMENTS 2,563,240 A      8/1951   Heath
3,370,815 A *    2/1968   Opperthauser ........... F16L 3/13
                                                        138/106

(Continued)

FOREIGN PATENT DOCUMENTS

EP         1909011 A2     4/2008
EP         2098768 A2     9/2009
(Continued)

*Primary Examiner* — Gwendolyn W Baxter
(74) *Attorney, Agent, or Firm* — Hoffmann & Baron, LLP (57) ABSTRACT

A pipe clamp includes two clamp parts for fastening a pipe to a channel type profile element having a longitudinal slot. Each clamp part has a curved pipe clamping portion, where in a mounted state the pipe clamping portions of the respective clamp parts are positioned opposite each other to accommodate a pipe section. Each clamp part has an anchoring portion formed at one end of each clamp part to anchor the pipe clamp to the profile element. The anchoring portion is essentially formed as a leg with a hammerhead, which is insertable in the longitudinal slot of the profile element and rotatable to engage the slot edges. A flange is formed at another end of each clamp part. The pipe clamp furthermore includes a tightening member associated with the clamp flanges for tightening them together.

13 Claims, 9 Drawing Sheets

(51) Int. Cl.
*F16L 3/10* (2006.01)
*F16L 55/035* (2006.01)

(58) Field of Classification Search
USPC .............................. 248/73, 74.1, 74.4, 62, 63
See application file for complete search history.

(56) References Cited

U.S. PATENT DOCUMENTS

| | | | | |
|---|---|---|---|---|
| 5,799,907 | A * | 9/1998 | Andronica | F16L 3/24 |
| | | | | 248/62 |
| 5,967,468 | A | 10/1999 | Veghte et al. | |
| 5,984,243 | A * | 11/1999 | Pfaller | F16L 3/1066 |
| | | | | 248/74.1 |
| 6,494,415 | B1 * | 12/2002 | Roth | F16L 3/24 |
| | | | | 248/62 |
| 7,992,829 | B1 * | 8/2011 | Baker | F16L 3/24 |
| | | | | 248/62 |
| 2009/0294600 | A1 * | 12/2009 | Dodge | F16L 3/12 |
| | | | | 248/73 |
| 2014/0097304 | A1 | 4/2014 | Mastro | |
| 2014/0265076 | A1 | 9/2014 | Weger et al. | |

FOREIGN PATENT DOCUMENTS

| | | |
|---|---|---|
| EP | 2166265 A2 | 3/2010 |
| GB | 1042814 | 9/1966 |
| WO | 93/00202 A1 | 1/1993 |
| WO | 00/06845 A2 | 2/2000 |

\* cited by examiner

PIPE CLAMP

CROSS-REFERENCE TO RELATED APPLICATIONS

This application is the National Stage of International Application No. PCT/NL2016/050072 filed Feb. 1, 2016, which claims the benefit of Netherlands Application Nos. NL 2014294, filed Feb. 13, 2015, and NL 2015499, filed Sep. 24, 2015, the contents of all of which are incorporated by reference herein.

FIELD OF THE INVENTION

The present invention relates to a pipe clamp for fastening a pipe to a channel type profile element having a longitudinal mounting slot having a slot width and being defined by slot edge portions.

BACKGROUND OF THE INVENTION

Pipe clamps having two clamp halves which are anchored directly by anchoring means to a profile element are known from for example WO 00/06845 A2 and U.S. Pat. No. 5,799,907. These known pipe clamps, tighten the pipe directly to the profile element. In US 2014/265076 an elastomeric cushion insert is disclosed which can be arranged around the pipe and between the clamp parts and which avoids the pipe to be in direct contact with the channel type profile element.

SUMMARY OF THE INVENTION

The invention relates to a pipe clamp including two clamp parts, each clamp part having:
- a curved pipe clamping portion, wherein in a mounted state the pipe clamping portions of the respective clamp parts are positioned opposite each other to accommodate a pipe section, with the clamp parts extending around diametrically opposite surface areas of said pipe section;
- an anchoring portion formed at one end of each clamp part to anchor the pipe clamp to the profile element, said anchoring portion essentially being formed as a leg with a hammerhead, said hammerhead having a width that exceeds the slot width and said leg having a smaller width than the slot width, the anchoring portion furthermore having a thickness smaller than the slot width, whereby the hammerhead is insertable in the longitudinal slot of the profile element and rotatable to engage the slot edges; and
- a flange formed at another end of each clamp part, said flanges of the clamp parts being adapted to be positioned opposite each other;
- the pipe clamp furthermore including a tightening member associated with the clamp flanges for tightening them together.

In a possible embodiment the curved pipe clamping portion of each clamp part extends over an angle of at least 90°.

In a possible embodiment of the pipe clamp the flange and the anchoring portion of each clamp part are parallel.

In a possible embodiment of the pipe clamp the legs of the respective clamp parts adjoin the curved pipe clamping portions respectively on a diametrically opposite location when viewed in the mounted state. Moreover, the leg of each clamp part may extend parallel to or along a tangent line of the pipe.

In a possible alternative embodiment of the pipe clamp the legs of the respective clamp parts adjoin the respective curved pipe clamping portions on a distance from a plane of symmetry in the mounted state, wherein said distance is smaller than the diameter of the pipe the pipe clamp is intended for.

In a possible embodiment of the pipe clamp the curved pipe clamping portion comprises a two-pronged portion located at the side of the legs, wherein the prongs have the same radius of curvature as the remainder of the pipe clamping portion.

In a possible embodiment of the pipe clamp the hammerhead is formed flush with the leg of the respective clamp section. Alternatively an end portion of the leg may be folded over such that the hammerhead is extending parallel with the associated leg.

In a possible embodiment of the pipe clamp the hammerhead has at either side a hook protrusion that extends towards the other end of the clamp part, and adapted to engage one of the slot edge portions of the profile element.

In a possible embodiment of the pipe clamp a separate vibration insulating lining is arranged on the respective pipe clamping portions. Alternatively a common vibration insulating lining is arranged to the pipe clamping portions of the two clamp parts.

In another possible embodiment a vibration insulating layer is integrally formed on the clamp part. For example a rubber insulating lining may be vulcanised on the (metal) clamp part. It is also possible to overmold an insulating layer, for example of TPE, on the (metal) clamp part.

In a possible embodiment of the pipe clamp the curved pipe clamping portions of the two clamp parts are interconnected by a hinge at the side where the anchoring portion is located.

In one preferred embodiment the hinge comprises a flexible plate member that is fixedly attached to the clamping portions.

In a possible embodiment the flexible plate member may be made of metal, preferably the same sheet metal as the pipe clamp parts are made of. The flexible plate member is then preferably welded to the clamping portions, e.g. by spot welds. However, in an alternative embodiment, the flexible plate may also be made of a different material, such as plastics material or a different metal. Also, the flexible plate may be attached to the clamping portions in alternative way, e.g. by an adhesive or by a mechanical fixing means, for example when welding is not an option due to non weldable materials.

In an alternative embodiment the flexible plate member could also be fixedly attached to the legs of the anchoring portions, in particular at or near the end where the legs adjoin the clamping portions.

In another possible embodiment hooks and holes are formed in the respective clamping portions which cooperate and constitute the hinge.

In a possible embodiment of the pipe clamp each pipe clamp part is formed in one piece from a metal strip.

The invention also relates to a pipe fastening system including a pipe clamp as described in the above and a channel type profile element having a longitudinal mounting slot having a slot width and being defined by slot edges, wherein in a mounted state the end portion of the curved pipe clamping portion that is facing the profile element engages the profile element.

The invention also relates to a method for forming a pipe clamp part as defined in the above from one metal strip.

The invention will be described in further detail in the following description with reference to the drawings.

DETAILED DESCRIPTION OF THE INVENTION

Figure 1:
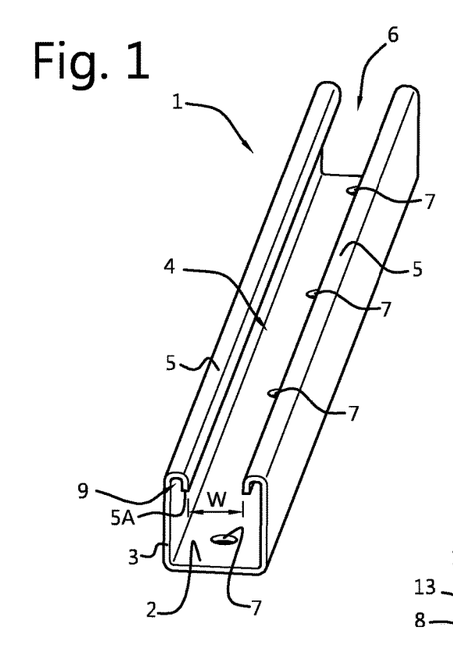
FIG. 1 shows in a view in perspective a channel type profile element.

FIG. 1 shows a channel type profile element 1. The channel type profile element 1 is a profile section often referred to as a "C-profile", a "C-rail" or a "strut rail". It has in cross section substantially a C-shape. The profile element 1 has a bottom 2, two opposite lateral walls 3 and a top side 4 which includes two inturned flanges 5 that define between them a slot 6. The slot 6 has a slot width w. In the bottom 2, mounting holes 7 are provided to mount the profile element to another structural element.

Figure 2:
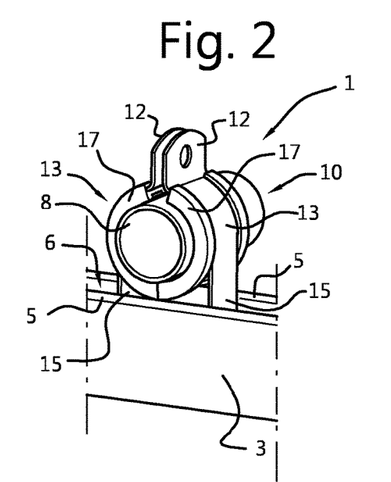
FIG. 2 shows a first embodiment of a pipe clamp according to the invention mounted on a channel type profile element.

In FIG. 2 is shown the profile element 1 on which a pipe clamp 10 is mounted. The pipe clamp 10 holds a pipe 8 of which in the figure only a section is shown. The pipe clamp 10 has two clamp parts 11, one of which is shown in FIG. 3 and FIG. 4.

Figure 3:
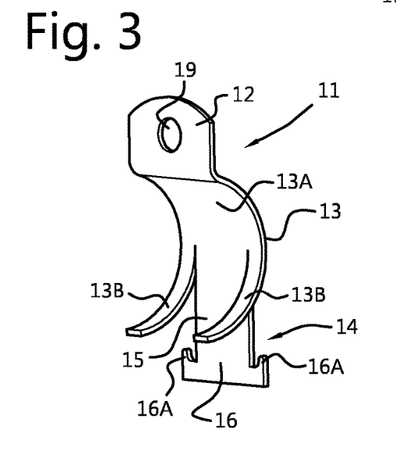
FIG. 3 shows in a view in perspective a clamp part of the pipe clamp of FIG. 2.
Figure 4:
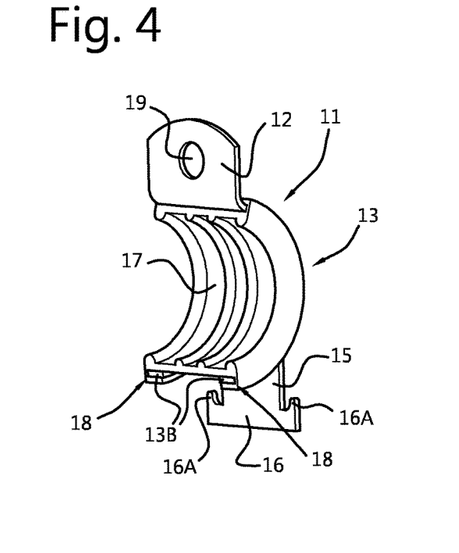
FIG. 4 shows in a view in perspective the clamp part of FIG. 3 with a vibration insulating lining.
Figure 5:
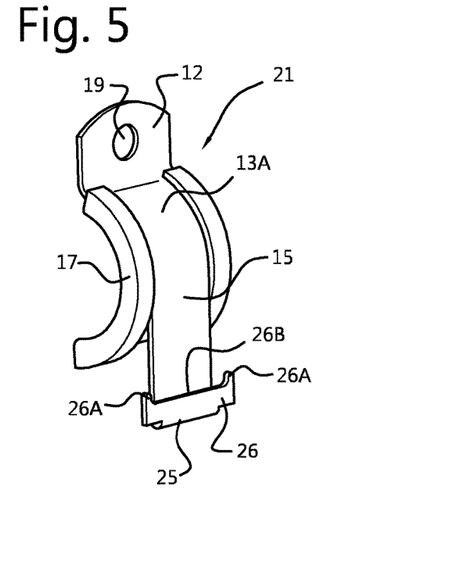
FIG. 5 shows in a view in perspective a clamp part of a second embodiment of a pipe clamp according to the invention.

The clamp part 11 shown in FIG. 3 is made of metal, preferably formed from one piece of metal strip. It has a curved pipe clamping portion 13.

Furthermore the clamp part 11 has an anchoring portion 14 formed at one end of the clamp part 11 to anchor the pipe clamp 10 to the profile element 1. The anchoring portion 14 is essentially formed as a leg 15 with on its free end a hammerhead 16. The hammerhead 16 has a width that exceeds the slot width w and the leg 15 has a smaller width than the slot width w. The anchoring portion furthermore has a thickness smaller than the slot width w. Thus the hammerhead is insertable in the longitudinal slot 6 of the profile element 1 beyond the lower end 5A (cf. FIG. 1) of the flanges 5 and rotatable to engage the slot edges formed by the lower end 5A of the inturned flanges 5.

The clamp part has a flange 12 formed at an end opposite the end where the anchoring portion 14 is located. The flange 12 is provided with a through hole 19 for passing through a screw or a bolt or another suitable tightening means.

The curved clamping portion in this embodiment comprises a curved upper clamping portion 13A and a lower clamping portion constituted by two curved prongs 13B that extend from the upper clamping portion 13A with the same radius of curvature. The curved clamping portion 13 of one clamping part 11 in the embodiment shown, extends over an angle of approximately 160°.

A vibration insulating lining 17 is advantageously arranged on the respective pipe clamping portions 13 as is shown in FIG. 4. This vibration insulating lining 17 is preferably a profile element made of rubber or an elastomer material. Advantageously the vibration insulating element 17 is made by extruding a rubber or elastomer profile and cutting sections thereof which can be arranged in the pipe clamp as shown herein. The vibration insulating lining 17 has a C-shaped profiled section as can be seen in FIG. 4. It has thus gripping formations 18 whereby it grips around the lateral edges of the upper clamping portion 13A and around the prongs 13B. The shape of the clamping portions 13 and the insulating lining 17 allow the two to be assembled in the manufacturing site. Advantageously no assembly of components has to take place at the work site which is for example the case with the pipe clamp and cushion insert shown in US 2014/265076.

Figure 22:
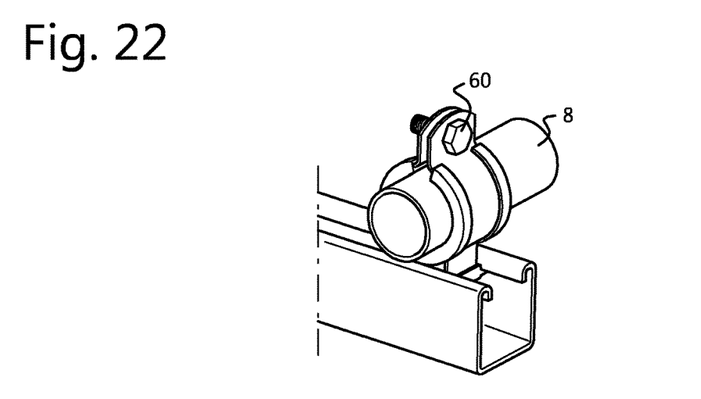

In a mounted state (cf. FIG. 2) the pipe clamping portions 13 of the respective clamp parts 11 are positioned opposite each other to accommodate a pipe section 8. The respective clamp portions 13 extend around diametrically opposite surface areas of said pipe section 8 as can be seen in FIG. 2. This has the advantage that the pipe can be firmly held without the pipe having to be clamped directly against the profile element 1. In the mounted state, the flanges 12 of the clamp parts 11 are positioned opposite each other and can be interconnected by a bolt, screw or other suitable tightening member as is for example illustrated in FIG. 22.

In the embodiment shown in FIGS. 3 and 4, the pipe clamp part 11 is made out of one piece of metal strip by cutting and bending. In particular the prongs 13B are formed by making two longitudinal cuts in the strip and bending the initially flat prongs 13B away from the rest of the leg 15 into a curved shape as shown. The hammerhead 16 has in this embodiment at either side a hook protrusion 16A that extends towards the other end of the clamp part 11, and is adapted to engage in an intermediate space 9 defined between the edge 5A of the flange 5 and the lateral wall 3 of the profile element 1.

The hammerhead 16 lies flush with the leg 15. The hammerhead 15 has the same width as the curved portion 13 of the clamp part 11. The flange 12 may also have the same width as the curved portion 13.

Another embodiment of a pipe clamp is illustrated in FIGS. 5-8. This pipe clamp 20 has two pipe clamp parts 21 wherein the difference with the previous embodiment is that it has a hammerhead 26 formed at an end portion 25 end of the leg 15, which end portion 25 of the leg 15 is folded over such that the hammerhead 26 lies in a plane parallel with the associated leg 15. The remainder of the clamp part 21 is essentially the same as the clamp part 11 of the previous embodiment and the same features are thus indicated by the same reference numerals.

Figure 6:
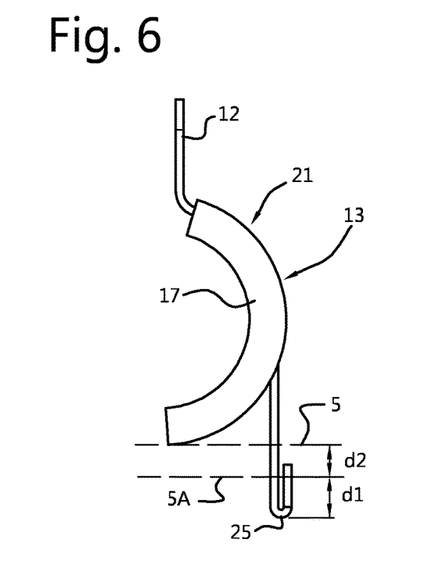
FIG. 6 shows in a side elevational view the clamp part of FIG. 5.
Figure 7:
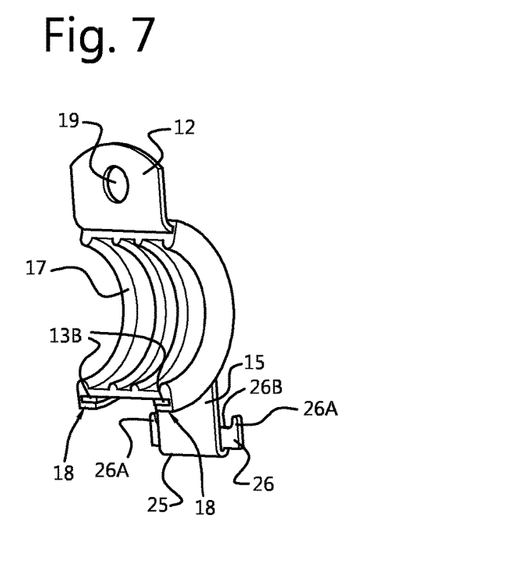
FIG. 7 shows in another view in perspective the clamp part of FIG. 5.

Whereas the pipe clamp illustrated in FIG. 2-4 is suitable for small pipe diameters, i.e. up to 0.75 inch, the embodiment of FIG. 5-8 is in particular advantageous if curved portions have to be formed with a larger radius of curvature, adapted to pipes with larger diameters. As can be seen in FIG. 6 the distance d1 between the bent end portion 25 of the leg 15 and the lower end of the flange 5A of the profile element 1 provides additional length to the strip to form the curved portion 13 with. However, at the same time the distance d2 between the underside of the curved portion 13 and the upper edge 26B of the hammerhead 26 can with this embodiment be adapted to the dimensions of the curved flanges 5 of the profile element 1 to be able to tighten the pipe 8 and clamp 10 firmly to the profile element 1.

In the embodiment of FIG. 5-8 the hammerhead 26 has hook protrusions 26A like the hook protrusions 16A in the embodiment of FIG. 2-4. It is also possible to omit the hook portions and having a hammerhead 26 with a straight upper edge 26B as is shown in FIG. 9.

The pipe clamp shown in FIG. 2-4, or FIG. 5-8 is mounted to the profile element 1 by inserting the hammerhead 16, 26 of the separate clamp parts 11, 21 separately through the slot 6 in the profile element 1 and then turn them to anchor the clamp part 11, 21 to the profile element 1. Then the pipe 8 can be inserted between them and the clamp parts 11, 21 at the flanges 12 can be tightened together by means of a screw, a bolt or the like. By tightening the clamp parts 11, 21 around the pipe 8 the prongs 13B covered with insulating material will be pressed against the upper side of the flanges 5 of the profile element. The legs 15 with hammerhead 16, 26 may tilt through the tightening whereby the hammerheads 16, 26 are secured firmly to the profile section 1.

Figure 10:
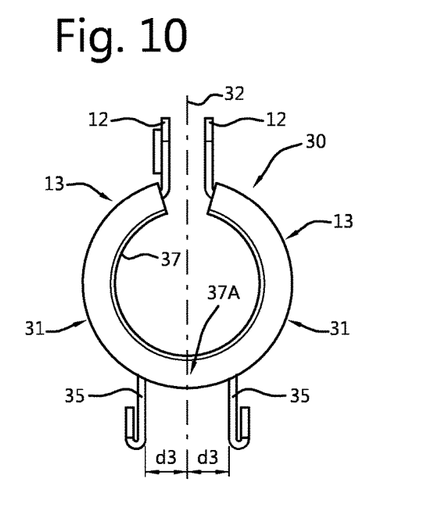
FIG. 10 shows in a side elevational view a third embodiment of a pipe clamp according to the invention.
Figure 11:
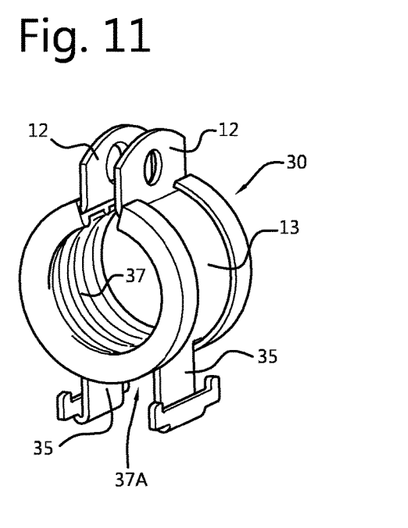
FIG. 11 shows in a view in perspective the pipe clamp of FIG. 10.

In FIGS. 10 and 11 another pipe clamp 30 is shown, with clamp parts 31 having essentially the same features as the embodiment shown in FIGS. 5-8, but which has legs 35 that adjoin the curved portion at another location. Corresponding features with the embodiment of FIG. 5-8 are indicated by the same reference numerals.

Figure 8:
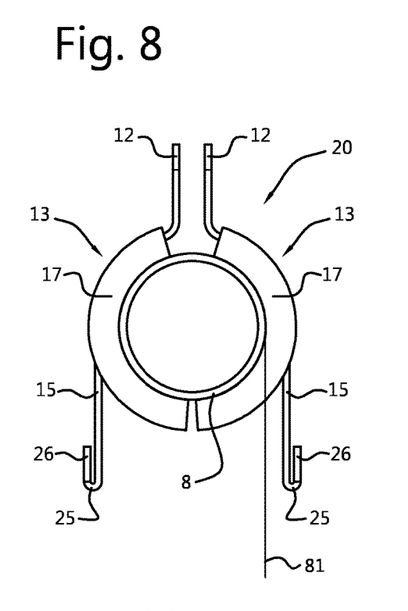
FIG. 8 shows in a view in perspective a modified clamp part of the second embodiment of a pipe clamp.
Figure 9:
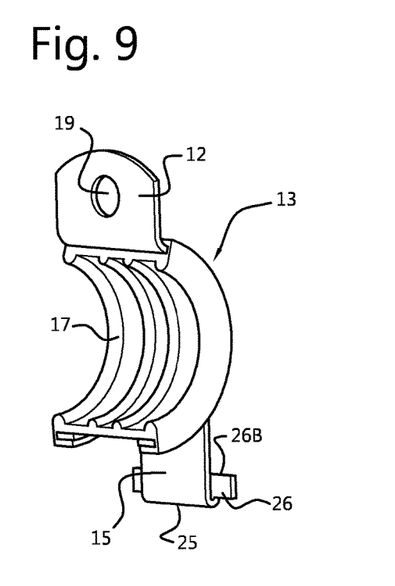
FIG. 9 shows in a side elevational view the pipe clamp consisting of two clamp parts shown in FIG. 5-7.

In the embodiment of FIG. 5-8 the legs 15 of the respective clamp parts 21 adjoin the curved pipe clamping portions 13 respectively on a diametrically opposite location when viewed in the mounted state (cf. FIG. 8). The leg of each clamp part 21 extends parallel to (cf. FIG. 8) or along (e.g. if there is no lining 17 arranged in the clamp part) a tangent line 81 of the pipe 8.

In the embodiment of FIG. 10-11 the legs 35 of the respective clamp parts 31 adjoin the respective curved pipe clamping portions 13 on a distance d3 from a plane of symmetry 32 in the mounted state. The distance d3 is smaller than the diameter of the pipe the pipe clamp 30 is intended for. The clamp 30 thus has so to say a smaller base than the clamp 20.

In the embodiment of FIG. 10-11 the clamp 30 has a common vibration insulating lining 37 for both clamp parts 31. This in contrast with the previous embodiments, wherein each clamp part was provided with its own vibration insulating lining 17.

The clamp parts 31 of the clamp 30 may be separate parts like in the embodiment of FIG. 5-8. However, it is also possible to interconnect the clamp parts by a hinging structure at an end of the curved portion located at the side where the anchoring portion is located.

Figure 12:
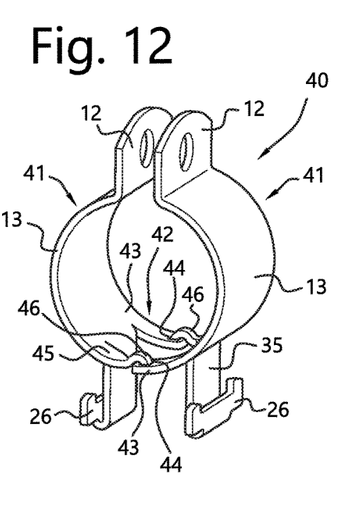
FIG. 12 shows in a view in perspective a fourth embodiment of a pipe clamp according to the invention in a closed state.
Figure 13:
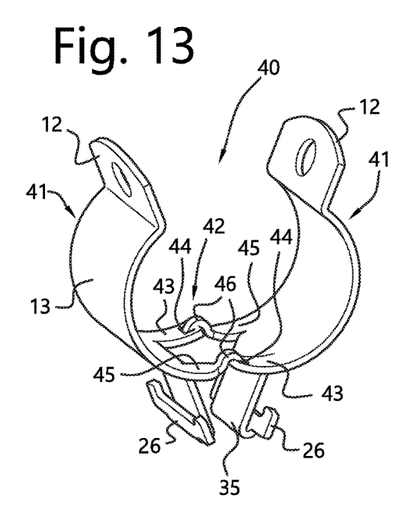
FIG. 13 shows in a view in perspective the pipe clamp of FIG. 12 in an open state.
Figure 14:
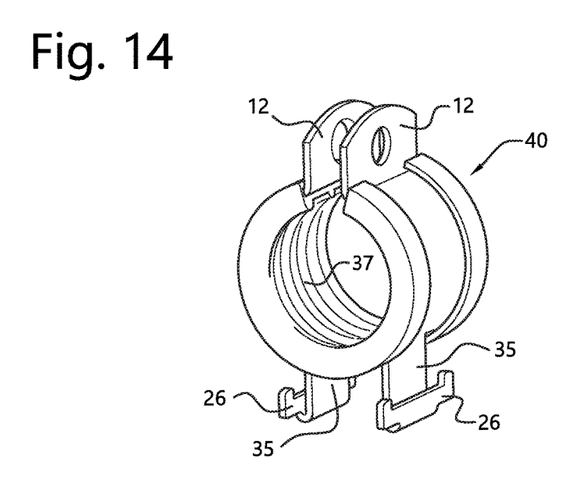
FIG. 14 shows in a view in perspective the pipe clamp of FIG. 12 with a vibration insulating liner arranged in it.

In FIG. 12-14 is illustrated a pipe clamp 40 similar to the one of FIG. 10-11, wherein the clamp parts are connected by a hinge structure 42. By the hinge structure 42 the clamp parts 41 can be moved between a closed state (FIG. 12, FIG. 14) and an open state (FIG. 13) in which the pipe 8 can be arranged in the pipe clamp 40.

The hinge structure 42 in the specific embodiment shown comprises on each end of the curved portion 13 a prong 43 which is provided with a hole 44 and another prong 45 on which a hook 46 is formed. Each hook 46 engages in the hole 44 in the prong of the other clamp part 41 and allows a swivelling movement between the two clamp parts 41.

The pipe clamp 40 can be provided with a vibration insulating lining 37 as is shown in FIG. 14 which is similar to the lining 37 shown in FIG. 10-11.

It is noted that the hinging structure 42 by no means is the only possible hinging structure. The skilled person will contemplate that other suitable hinging structures are possible. It is noted also that the common vibration insulating lining 37, in the embodiment of FIGS. 10 and 11, in which the metal clamp parts are not connected by a hinging structure, the lining 37 connects them and in the region 37A between the legs 35 effectively functions as a hinging structure.

Figure 27:
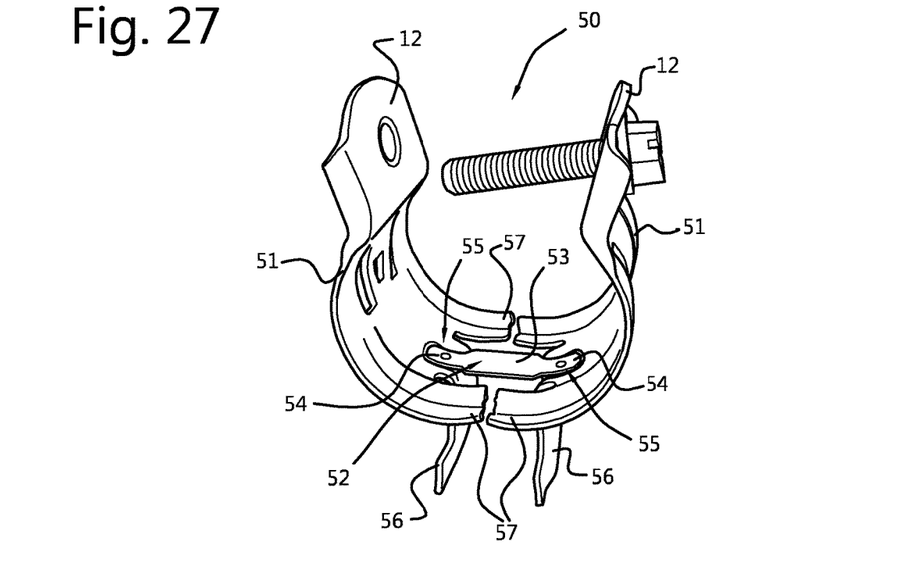
FIG. 27 shows in a view in perspective an embodiment of a pipe clamp with a hinge in an open state.
Figure 28:
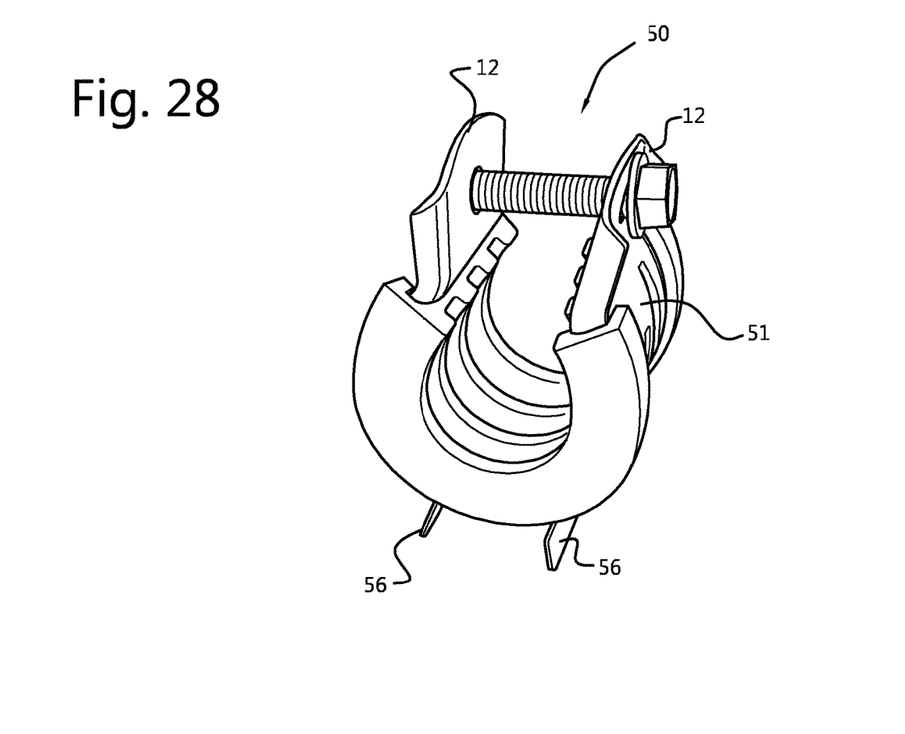
FIG. 28 shows in a view in perspective the pipe clamp of FIG. 27 in a closed state and provided with a vibration insulating lining.

In FIGS. 27 and 28 another embodiment of a pipe clamp 50 is shown having a hinging structure 52. In this embodiment the hinging structure 52 comprises a metal plate member 53 that is attached to the pipe clamping portions 51 to interconnect them. In the preferred embodiment the plate member 53 is attached with its respective end portions 54 by spot welds to the end 55 of the pipe clamping portions at which the legs with the hammerheads 56 are provided. In an alternative embodiment the plate member could also be attached to the legs of the hammerheads 56.

It is noted that the plate member 53 in the shown embodiment is made of metal, preferably the same sheet metal as the clamp parts are made of. It is however conceivable that alternatively the plate member is made of another flexible material, e.g. plastics material, elastomeric material, or another metal than the mentioned sheet metal.

Instead of being spot welded, the plate member 53 could alternatively be attached by other fixing means to the ends 55 of the pipe clamping portions, e.g. by welding, gluing, soldering, forming or a mechanical fastener.

The clamping portions each have prongs 57 on their lateral sides at said end 55. The hinge plate 53 is located between the prongs 57. The hinge plate 53 is bendable around a bending axis that is substantially parallel with the central axis of the pipe clamp so as to open or close the pipe clamp.

Advantageously the pipe clamp 50 is supplied in an assembled state with the vibration insulating lining arranged to the curved clamp parts as is shown in FIG. 28. Thus the pipe clamp 50 does not have to be assembled by the fitter at the construction site which saves time and requires less cumbersome mounting work. The pipe clamp 50 can simply be mounted to the profile element after which the pipe can be positioned in the clamp 50 and the clamp can be closed by means of a screw or the like (cf. FIG. 28).

Figure 15:
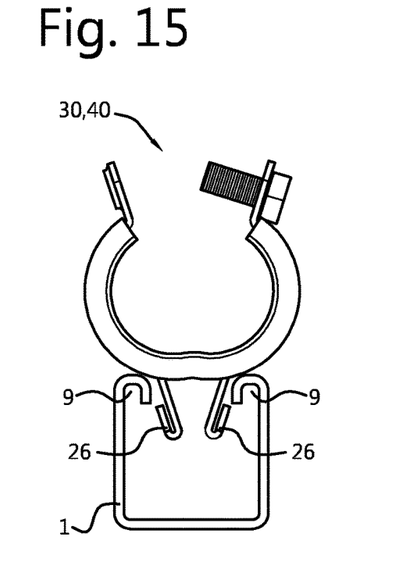
FIG. 15 shows the pipe clip of FIG. 14 during mounting on a channel type profile element.
Figure 16:
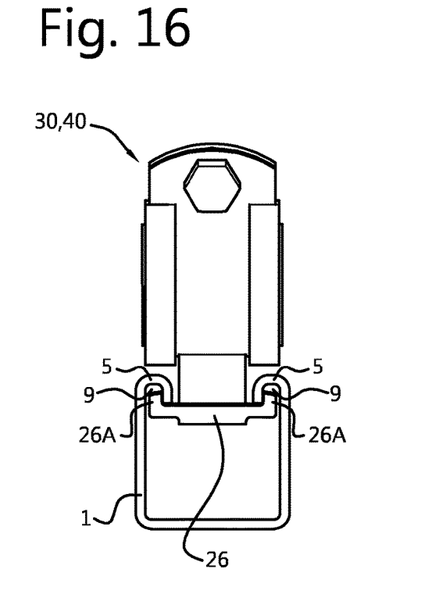
FIG. 16 shows the pipe clip of FIG. 14 mounted on a channel type profile element.
Figure 17:
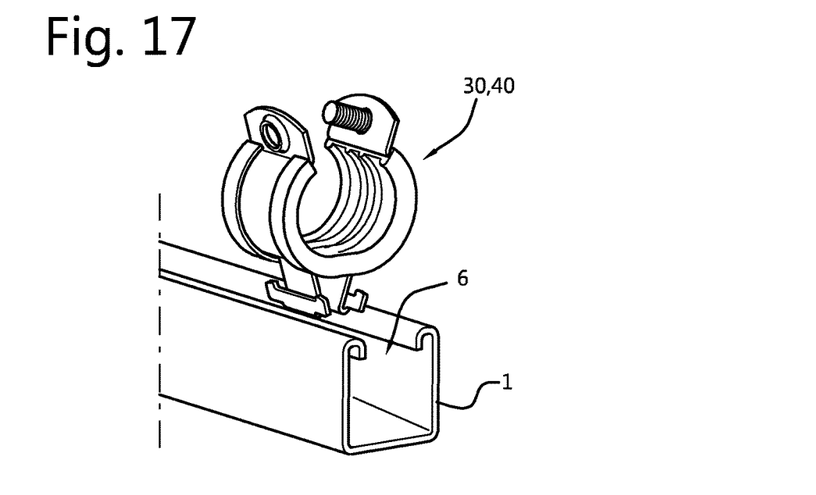
FIG. 17-20 illustrate in a view in perspective the different stages of mounting the pipe clamp of FIG. 14 to the channel type profile element.
Figure 18:
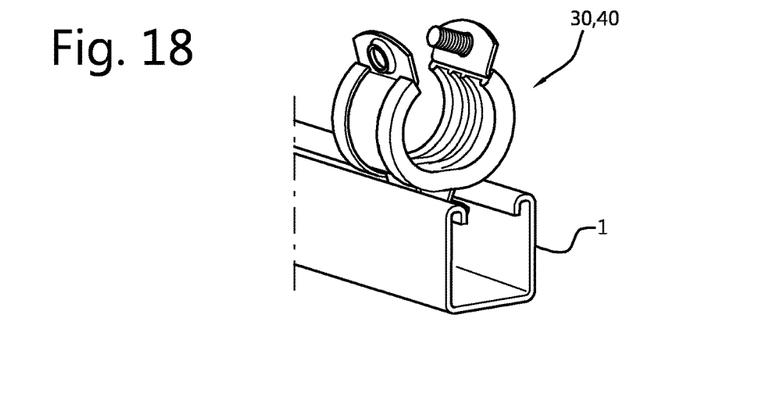
Figure 19:
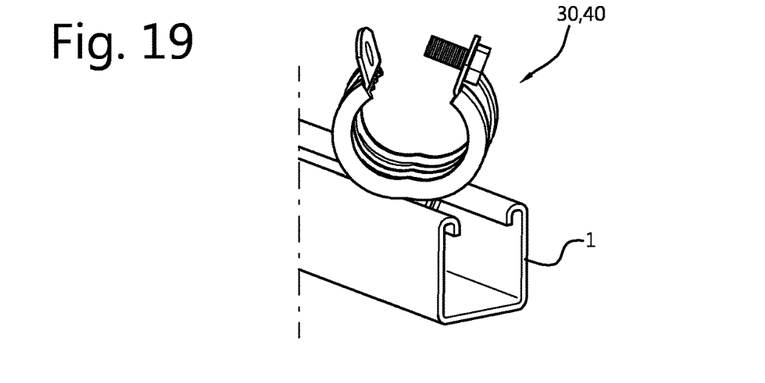
Figure 20:
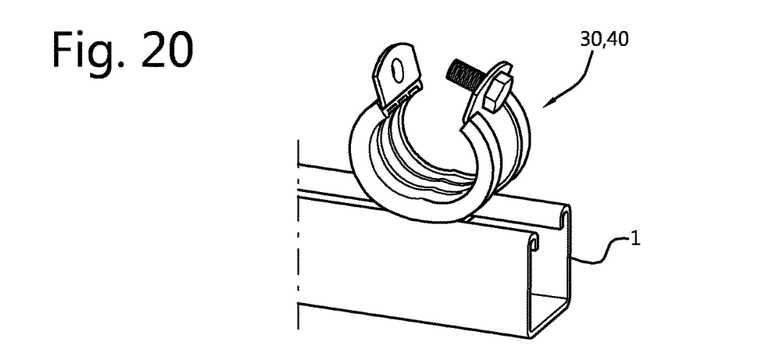

In FIG. 15-20 is illustrated how a pipe clamp 30, 40, as shown in FIG. 10-11 and FIG. 12-14 respectively, is mounted to a channel type profile element 1. In FIG. 17 is shown that the pipe clamp 30, 40 is hinged open, whereby the legs 35 are swivelled to each other. The hammerheads 26 of the anchoring means are brought so close to each other that they fit through the slot 6 of the profile element 1 as is illustrated in FIG. 15 and FIG. 18. The lower end of the curved portion rests on the upper side of the flanges 5 of the profile element 1. Then the pipe clamp 30 can be rotated over 90° as is illustrated in FIGS. 19 and 20, such that the hooks 26A can engage in an intermediate space 9 defined between the edge 5A of the flange 5 and the lateral wall 3 of the profile element 1.

Figure 21:
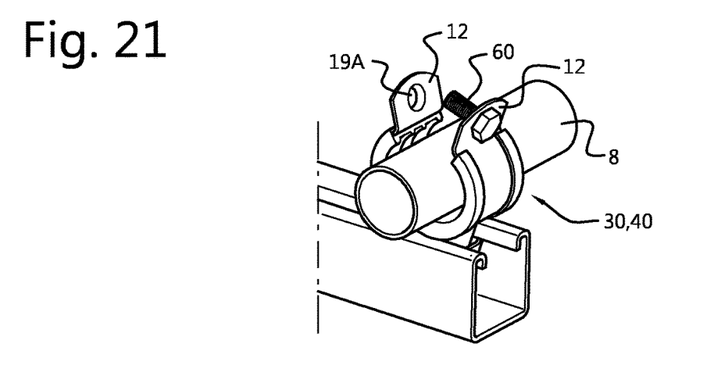
FIG. 21-22 illustrate in a view in perspective the different stages of arranging a pipe in the pipe clamp of FIG. 14.
Figure 24:
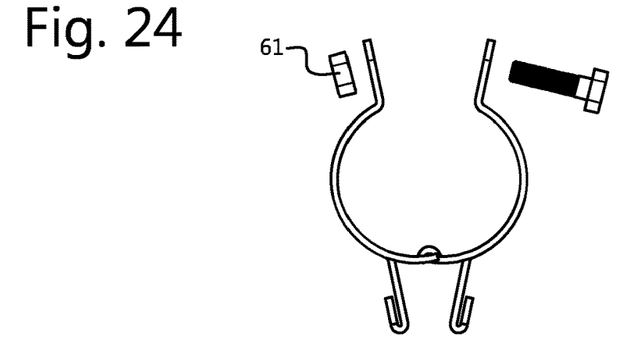
FIG. 24-26 shows the pipe clamp of FIG. 12 with different tightening means.
Figure 25:
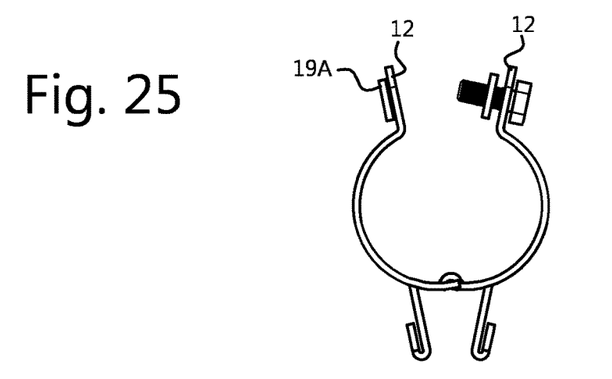
Figure 26:
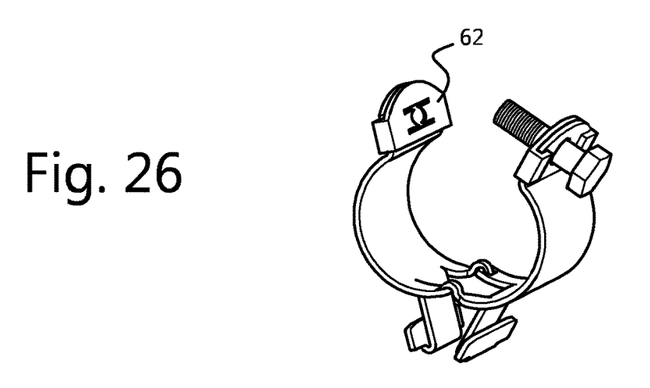

When the pipe clamp 30, 40 is in this position, a pipe can be arranged in the clamp 30, 40 as is illustrated in FIG. 21. Then the clamp can be closed, whereby the flanges 12 swivel towards each other and the flanges can be coupled to each other by a screw 60. In this specific embodiment one of the flanges 12 is provided with a threaded hole 19A, such that the screw can be screwed in that flange 12 without further tightening parts needed. This embodiment is also illustrated in FIG. 25. Other options to couple the flanges 12 are shown in FIG. 24 and FIG. 26, in which a loose nut 61, or a slide nut 62 mounted on the flange 12 are used as female fastening means to cooperate with the shank of the screw 60.

By tightening the flanges 12 together the legs 35 may end up in a mutual parallel orientation. The legs 35 may also end up in a slightly tilted orientation, such that the hammerheads 26 are moved further away from each other than in the parallel orientation, in which case the clamp parts 31, 41 are more firmly secured to the profile element 1.

Figure 23:
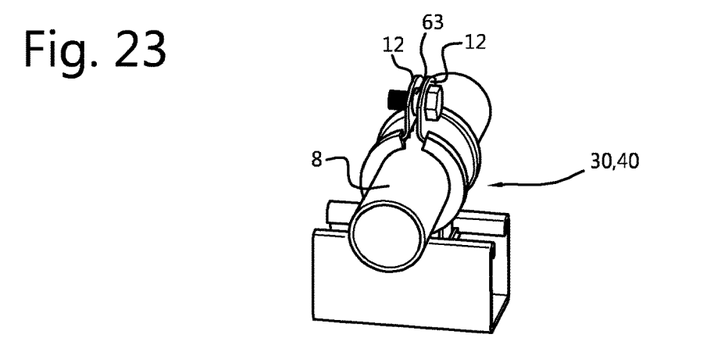
FIG. 23 shows in a view in perspective the pipe clamp of FIG. 14 in a mounted state with a spacer ring between the flanges.

The screw can be tightened such that the pipe clamp 30, 40 firmly holds the pipe 8. It is also possible to limit the tightening force by applying a distance ring between the flanges 12 as is shown in FIG. 23. This allows that the pipe can shift with respect to the pipe clamp 30, 40 and this accommodates pipe expansion for example due to temperature changes.

In the above illustrated embodiments the clamp parts are made of one piece of metal strip by cutting (punching) and bending. It is also possible that for example the curved portion and flanges are made in one piece, and that the legs with the anchoring means (hammerhead) are made separately and attached to the curved portion by for example welding or gluing. It is also conceivable to make the pipe clamp from plastics material by injection molding. An injection moulded clamp part can be provided with an integral vibration insulating lining, for example by overmolding.

The invention claimed is:

1. A pipe clamp for fastening a pipe to a channel profile element having a longitudinal mounting slot having a slot width and being defined by slot edge portions,
   the pipe clamp including two clamp parts, each clamp part comprising:
   a curved pipe clamping portion, wherein in a mounted state the pipe clamping portions of the respective clamp parts are positioned opposite each other to accommodate a pipe section, with the clamp parts extending around diametrically opposite surface areas of said pipe section;
   an anchoring portion formed at one end of said each clamp part to anchor the pipe clamp to the profile element, said anchoring portion essentially being formed as a leg with a hammerhead, said hammerhead having a width that exceeds the slot width and said leg having a smaller width than the slot width, the anchoring portion furthermore having a thickness smaller than the slot width, whereby the hammerhead is insertable in the longitudinal slot of the profile element and rotatable to engage the slot edges; and
   a flange formed at another end of said each clamp part, said flanges of the clamp parts being adapted to be positioned opposite each other;
   the pipe clamp furthermore comprising a tightening member associated with the clamp flanges for tightening them together,
   wherein the curved pipe clamping portions of the two clamp parts are interconnected by a hinge at the side where the anchoring portion is located.

2. The pipe clamp according to claim 1, wherein a separate vibration insulating lining is arranged on the respective pipe clamping portions.

3. The pipe clamp according to claim 1, wherein a common vibration insulating lining is arranged to the pipe clamping portions of the two clamp parts.

4. The pipe clamp according to claim 1, wherein a vibration insulating layer is integrally formed on the clamp part.

5. The pipe clamp according to claim 4, wherein the clamp part is a metal clamp part and a rubber insulating lining is vulcanised on the clamp part.

6. The pipe clamp according to claim 4, wherein the clamp part is a metal clamp part and an insulating layer is overmolded on the clamp part.

7. The pipe clamp according to claim 1, wherein the hinge comprises a flexible plate member that is fixedly attached to the clamping portions.

8. The pipe clamp according to claim 7, wherein the flexible plate member is made of metal.

9. The pipe clamp according to claim 8, wherein the flexible plate is welded to the clamping portions.

10. The pipe clamp according to claim 8, wherein the flexible plate is spot welded to the clamping portions.

11. A pipe clamp for fastening a pipe to a channel profile element having a longitudinal mounting slot having a slot width and being defined by slot edge portions,
    the pipe clamp including two clamp parts, each clamp part comprising:
    a curved pipe clamping portion, wherein in a mounted state the pipe clamping portions of the respective clamp parts are positioned opposite each other to accommodate a pipe section, with the clamp parts extending around diametrically opposite surface areas of said pipe section;
    an anchoring portion formed at one end of said each clamp part to anchor the pipe clamp to the profile element, said anchoring portion essentially being formed as a leg with a hammerhead, said hammerhead having a width that exceeds the slot width and said leg having a smaller width than the slot width, the anchoring portion furthermore having a thickness smaller than the slot width, whereby the hammerhead is insertable in the longitudinal slot of the profile element and rotatable to engage the slot edges; and a flange formed at another end of said each clamp part, said flanges of the clamp parts being adapted to be positioned opposite each other;

the pipe clamp furthermore comprising a tightening member associated with the clamp flanges for tightening them together, wherein the clamp parts are interconnected at the anchoring portion sided end by a metal flexible hinging plate, that is welded to the clamp parts at the anchoring portion sided end of the clamping portions or at the legs of the anchoring portion.

12. The pipe clamp according to claim 11, wherein the metal flexible hinging plate is spot welded to the clamp parts at the anchoring portion sided end of the clamping portions or at the legs of the anchoring portion.

13. A pipe clamp for fastening a pipe to a channel profile element having a longitudinal mounting slot having a slot width and being defined by slot edge portions, the pipe clamp including two clamp parts, each clamp part comprising:

a curved pipe clamping portion, wherein in a mounted state the pipe clamping portions of the respective clamp parts are positioned opposite each other to accommodate a pipe section, with the clamp parts extending around diametrically opposite surface areas of said pipe section;

an anchoring portion formed at one end of said each clamp part to anchor the pipe clamp to the profile element, said anchoring portion essentially being formed as a leg with a hammerhead, said hammerhead having a width that exceeds the slot width and said leg having a smaller width than the slot width, the anchoring portion furthermore having a thickness smaller than the slot width, whereby the hammerhead is insertable in the longitudinal slot of the profile element and rotatable to engage the slot edges; and a flange formed at another end of said each clamp part, said flanges of the clamp parts being adapted to be positioned opposite each other;

the pipe clamp furthermore comprising a tightening member associated with the clamp flanges for tightening them together, wherein a common vibration insulating lining is arranged to the pipe clamping portions of the two clamp parts, wherein the vibration insulating lining connects the pipe clamping portions of the respective clamp parts and wherein the vibration insulating lining has a hinging region located between the legs of the anchoring portions of the two clamp parts.

* * * * *